(12) United States Patent
Mouton et al.

(10) Patent No.: US 7,596,663 B2
(45) Date of Patent: Sep. 29, 2009

(54) IDENTIFYING A CACHE WAY OF A CACHE ACCESS REQUEST USING INFORMATION FROM THE MICROTAG AND FROM THE MICRO TLB

(75) Inventors: Louis-Marie Vincent Mouton, Vallauris (FR); Gilles Eric Grandou, Plascassier (FR); Stephane Eric Brochier, Chateauneuf de Grasse (FR)

(73) Assignee: ARM Limited, Cambridge (GB)

( * ) Notice: Subject to any disclaimer, the term of this patent is extended or adjusted under 35 U.S.C. 154(b) by 382 days.

(21) Appl. No.: 11/599,596

(22) Filed: Nov. 15, 2006

(65) Prior Publication Data

US 2008/0114939 A1    May 15, 2008

(51) Int. Cl.
*G06F 12/00* (2006.01)
(52) U.S. Cl. .................. 711/128; 711/202; 711/205; 711/206; 711/207
(58) Field of Classification Search .................. 711/128, 711/202, 205–207, 209
See application file for complete search history.

(56) References Cited

U.S. PATENT DOCUMENTS 6,854,046 B1 *   2/2005   Evans et al. .................. 711/203

\* cited by examiner

*Primary Examiner*—Jasmine Song
(74) *Attorney, Agent, or Firm*—Nixon & Vanderhye P.C.

(57) ABSTRACT

A data processor operable to process data said data processor comprising: a set associative cache divided into a plurality of cache ways and operable to store data processed by said data processor; a buffer operable to store a table comprising a plurality of mappings of pages of virtual addresses to pages of physical addresses for said data processor; a data store comprising a plurality of data entries each operable to store data for identifying an address of a memory location for each of a plurality of recent cache accesses, each of said plurality of data entries comprising a page index indicating a page in an address space, offset data indicating a location within said page and cache way data identifying a cache way of a cache storage location accessed by said cache access; wherein said data processor is operable in response to a cache access request comprising a virtual address indicating a memory location to access said table and said data store to determine whether said cache access request is to one of said plurality of recently accessed cache storage locations and if so to identify a cache way of said cache storage location from data stored in both said data store and said table.

14 Claims, 7 Drawing Sheets

IDENTIFYING A CACHE WAY OF A CACHE ACCESS REQUEST USING INFORMATION FROM THE MICROTAG AND FROM THE MICRO TLB

BACKGROUND OF THE INVENTION

1. Field of the Invention

The field of the invention relates to data processing and in particular to accessing caches using µTAGs.

2. Field of the Invention

This invention relates to the field of data processing systems. More particularly, this invention relates to the field of accessing data within a cache.

3. Description of the Prior Art

Caches within data processors can store large amounts of data. Accessing data within caches can be quite a complicated procedure requiring addresses of a relatively large size. Manipulation of such addresses can therefore require significant amounts of power and time. Caches have been organised in a number of ways in order to reduce power and time overheads involved in accessing storage locations within the caches.

One popular way of configuring a cache is the so-called 'set associative' cache. A 16 Kbyte set associative cache is shown in FIG. 1. The cache shown is such a 4-way set associative cache 10 having 4 ways 11, 12, 13, 14 each containing a number of cache lines 20. A data value (in the following examples, a word) associated with a particular address 35 can be stored in a particular cache line of any of the 4 ways (i.e. each set has 4 cache lines, as illustrated generally by reference numeral 22). Each way stores 4 Kbytes (16 Kbyte cache/4 ways). If each cache line stores eight 32-bit words then there are 32 bytes/cache line (8 words×4 bytes/word) and 128 cache lines in each way ((4 Kbytes/way)/(32 bytes/cache line)). Hence, in this illustrative example, the total number of sets would be equal to 128, i.e. 'M' in the figure would be 127.

In order to address data stored in this sort of a cache an address 35 comprising a SET or index portion 37, which indicates which of the sets or lines the address is referring to and a TAG portion 36 indicating which of the four ways it is in is used. Such an address identifies a cache line and a cache way. The line being identified by the set and a comparison and match of TAGs stored in 4 TAG RAMs 25 with the TAGs in the corresponding set of the 4 caches 10 indicating the way. In reality more than one data word may be stored in a cache line within a cache way and thus, the address may contain further information.

When accessing data stored in a cache organised in this way, any virtual address produced by a programming model will need to be converted to a physical address. This can slow the procedure, as the program will produce the virtual address early, but the data cannot be accessed until it is converted to a physical address.

A known way of converting a virtual address to a physical address is by the use of a translation lookaside buffer or TLB. FIG. 2 shows a known way of accessing data during which a virtual address is converted to a physical address, the physical address then being used to access the data. The physical address 35 comprises a tag portion 36 and an index portion 37. The index portion is used to indicate which set within the cache ways the address refers to. Thus, a corresponding line within the plurality of cache tag directories 40 is selected using the index portion of address 35. The tag portion 36 of address 35 is then compared in comparator 60 with the four tags stored in each of the four cache tag directories that correspond to the four ways of the cache. When a comparison gives a match this indicates the cache way storing the data item and this data item can then be accessed from cache 50 using multiplexer 70.

This is one way in which data identified by a virtual address can be accessed. The initial step in this procedure is conversion of the virtual address to a physical address using a table lookaside buffer. This is not a fast step and thus, having this as the first step in the procedure considerably slows the critical path. An alternative to this is shown in FIG. 3. This system is referred to as a virtually indexed/physically tagged cache system. In this example the data access is performed using the virtual index to select which set (or line) the tag will be stored in. Thus, as soon as the virtual address is available this step can be performed in parallel with the conversion of the virtual address to a physical address using the TLB 30. Once the physical tag has been produced by the TLB 30 this is compared with the four tags selected from the cache tag directory by the index. When a match is found then this is used to access the data from the cache 50.

This is faster than the data access shown in FIG. 2. However, tags can be relatively long pieces of data, for example a memory system which has a 32K 4-way set-associative cache structure (consisting of 64 byte cache line size), would have tags of 19 bits (for a processor with 32-bit addresses). Thus, the comparison stage can be slow.

Furthermore, this process requires the accessing of multiple RAMs i.e. multiple cache tag directories and cache data arrays (RAMs) are accessed during the procedure and power consumption is therefore high.

One known way of addressing the issue of always having to access multiple RAMS is to use µTAGs. µTAGs are used to store information regarding the cache way of recent cache accesses. These are particularly useful in instruction cache accesses. As instructions are often processed in loops the same instruction may be accessed multiple times in close succession. Once a cache access has been made it is known which cache way the location accessed is in, and thus, storing information on recent cache accesses in the form of µTAGs can help reduce the number of times the multiple RAMS need to be enabled. However, in order to be able to associate a cache access request with a previous access substantially the full address of the cache line needs to be stored along with the information on the cache way. An address is often 32 bits long while the information on the cache way is generally only a few bits, depending on the number of ways to be identified. Thus, this solution is expensive in storage particularly if cache access information for several recent cache accesses is stored.

SUMMARY OF THE INVENTION

A first aspect of the present invention provides a data processor operable to process data said data processor comprising: a set associative cache divided into a plurality of cache ways and operable to store data processed by said data processor; a buffer operable to store a table comprising a plurality of mappings of pages of virtual addresses to pages of physical addresses for said data processor; a data store comprising a plurality of data entries each operable to store data for identifying an address of a memory location for each of a plurality of recent cache accesses, each of said plurality of data entries comprising a page index indicating a page in an address space, offset data indicating a location within said page and cache way data identifying a cache way of a cache storage location accessed by said cache access; wherein said data processor is operable in response to a cache access request comprising a virtual address indicating a memory location to access said table and said data store to determine whether said cache access request is to one of said plurality of recently accessed cache storage locations and if so to identify a cache way of said cache storage location from data stored in both said data store and said table.

The present invention recognises that although nearly the full address of the cache access request is required to be able to identify a subsequent cache access request as being to the same cache location as a previous one, some of this information is already stored in the processor within the μTLB. The μTLB stores mappings of pages of virtual addresses to pages of physical addresses, for a portion of the memory. This information generally comprises the mappings of the higher order bits of the virtual addresses to the higher order bits of the physical addresses. Thus, the present invention recognises that if it makes use of this data that is already stored it need only store a portion of the address for recent cache accesses, the portion being the offset data portion indicating an offset within the page provided that it stores an indication of the page that this offset relates to. Pages within the μTLB table are identified by a page index and thus, this page index is sufficient to identify a page. It is generally only a few bits (3 for example, if there are 8 pages mapped in the μTLB) and this means that the mappings of the higher order bits of the address can be known by storing a few bits. In this way enough of the address of a previous cache access is known to be able to identify whether it is the same as a present cache access. As the data store also stores data indicating the cache way of the cache hit of the previous cache access, when a match of a present cache access to a previous one is made, the cache way is known. Thus, the cache way can be determined from this information which allows the data processor to enable just this cache way for the cache access, thereby providing a significant power saving, while only storing a portion of the address in an additional data store.

In some embodiments, said data processor is operable in response to said cache access request to: transmit a higher portion of said virtual address to said buffer and to compare said higher portion with said virtual address portion of said mappings stored in said table and to transmit a lower portion of said virtual address to said data store and to compare said lower portion with said offset data; and in response to a match in said buffer, to determine a page of said physical memory from said match and to output a page index identifying said page to said data store; and in response to at least one match of said lower portion with said offset data to compare said at least one page index stored associated with said at least one matched data with said page index output by said buffer and in response to a match, said data processor is operable plurality of recently accessed cache storage locations and if so to identify a cache way of said cache storage location from data stored in both said data store and said table.

The present invention recognises that although nearly the full address of the cache access request is required to be able to identify a subsequent cache access request as being to the same cache location as a previous one, some of this information is already stored in the processor within the μTLB. The μTLB stores mappings of pages of virtual addresses to pages of physical addresses, for a portion of the memory. This information generally comprises the mappings of the higher order bits of the virtual addresses to the higher order bits of the physical addresses. Thus, the present invention recognises that if it makes use of this data that is already stored it need only store a portion of the address for recent cache accesses, the portion being the offset data portion indicating an offset within the page provided that it stores an indication of the page that this offset relates to. Pages within the μTLB table are identified by a page index and thus, this page index is sufficient to identify a page. It is generally only a few bits (3 for example, if there are 8 pages mapped in the μTLB) and this means that the mappings of the higher order bits of the address can be known by storing a few bits. In this way enough of the address of a previous cache access is known to be able to identify whether it is the same as a present cache access. As the data store also stores data indicating the cache way of the cache hit of the previous cache access, when a match of a present cache access to a previous one is made, the cache way is known. Thus, the cache way can be determined from this information which allows the data processor to enable just this cache way for the cache access, thereby providing a significant power saving, while only storing a portion of the address in an additional data store.

In some embodiments, said data processor is operable in response to said cache access request to: transmit a higher portion of said virtual address to said buffer and to compare said higher portion with said virtual address portion of said mappings stored in said table and to transmit a lower portion of said virtual address to said data store and to compare said lower portion with said offset data; and in response to a match in said buffer, to determine a page of said physical memory from said match and to output a page index identifying said page to said data store; and in response to at least one match of said lower portion with said offset data to compare said at least one page index stored associated with said at least one matched data with said page index output by said buffer and in response to a match, said data processor is operable to identify said cache way from cache way data stored in an entry with said matched page index and offset data.

The data processor can determine the cache way by comparing the higher portion of the virtual address to the virtual address data stored in the table of the buffer and from this data can determine which page this memory location is within. As this buffer only stores a certain number of pages this information can be output as a page index data which is naturally smaller than the higher portion of the virtual address bits. The lower portion of the virtual address is compared to the offset data stored in the data store until one or more matches are found. The page index from the buffer comparison is then input into the data store and compared to the page index stored in association with the matched offset data. When a match is found it can be seen that this data is the data relating to a recent cache access to the same cache storage location. Thus, the cache way that this cache storage location is in can be determined from this entry in the data store. This increases the efficiency of finding this information using a table that is already present in the data processor.

In some embodiments, said cache comprises an instruction cache.

Although embodiments of this invention are applicable to a large number of different caches, it is particularly applicable to instruction caches. This is because when instructions are processed, they are often processed in loops such that instructions recur frequently and regularly close to each other. Thus, storing data from previous cache accesses to the same location is helpful as the arrangement of the instructions being fetched means that information from an access to the same storage location is often present in the data store.

In some embodiments, in response to said comparison of said higher order of said virtual address with said virtual address portion of said mappings stored in said buffer not generating a match said data processor is operable to flush said data store.

When it is found that the table does not contain a page for a cache access, it is found easiest to flush all of the data in the data store as some of it may no longer be valid and as it is a small buffer not storing much information, it is easier to flush the lot rather than select individual entries that relate to this removed page. It should be noted that the alternative method of selecting entries relying on removed pages could be performed but in preferred embodiments it is not.

In some embodiments, said pages of addresses are all of equal size.

Having pages in a table of equal size is clearly simpler to implement than having pages of different sizes and it may be the most efficient way of mapping the memory.

In other embodiments, said pages of addresses are not all of equal size.

It can be efficient in some embodiments, however, to use page tables of different sizes. For example, it is found to be helpful sometimes to put the whole of an operating system in one page, this is obviously a large page. User applications can then be put in smaller pages. Furthermore, having different sized pages helps utilise the memory more efficiently and reduces the number of holes that may occur within the memory representing unused memory spaces. However, clearly memory pages of different sizes presents some challenge to this technique.

In some embodiments, said buffer is operable to store for larger page sizes bits additional to those required for identifying said larger page.

Generally the implementations are such that user data is stored in the smaller pages so that the buffer and table can be used in the same way as if all the pages were the same size. However, if a cache access is to a memory storage location in one of the larger pages, embodiments of the invention can still process it. In particular, the buffer has comparators associated with it for each bit that it stores in an entry in its table. Thus, for the larger page sizes, clearly only a fewer of the higher bits are required to identify that page, however, there is still storage space and comparators for the other bits. Thus, although only the higher bits indicate a page table, the other bits are still there and are compared. These additional bits relate to a smaller page size within the larger page size. Thus, if they do match then the page index derived is in effect valid for the smaller memory portion in the larger page. If the additional bits do not match then it is as though there is not a hit in the buffer. If there is not a hit then it flushes the data store. Furthermore, it acts to update the table so that the smaller space within this large page is the portion holding the last cache access. This means that the data is as up-to-date as possible and makes it much more likely that you will get a hit in subsequent accesses.

In some embodiments, said data processor is operable to compare said higher portion of said virtual address with said portion of said mappings stored in said buffer and to compare said lower portion of said virtual address with said offset data stored in said data store at the same time.

Although the comparisons of the different portions of address stored in the μTLB table and μTAG can be performed at different times, it is clearly more efficient from a performance point of view if they are performed at substantially the same time in parallel to each other.

In some embodiments said data store further comprises a valid bit.

A valid bit in the data store enables a μTAG to be evicted. Furthermore, they are needed as the data store is initially empty and can be flushed at any time.

In some embodiments, in response to said offset and page index data not generating a match said data processor is operable to perform said cache access using conventional means and following said cache access completing said data processor is operable to update said data store to store cache line data, page index data and cache way data of said completed cache access in said data store.

Following a miss in the data store, in other words a cache access request to a location not recently accessed, the data store can be updated to keep it as efficient as possible by storing the information relating to the most recent cache access. This updating can be done in a number of ways but is generally done in a round robin way.

A second aspect of the present invention provides a method of determining which of a plurality of cache ways a cache access request is to access comprising the steps of: in response to a cache access request comprising a virtual address: (i) accessing a buffer operable to store a plurality of mappings of pages of virtual addresses to pages of physical addresses to determine a page of said cache access request; (ii) accessing a data store comprising a plurality of entries each operable to store data identifying a cache storage location within said cache for each of a plurality of recent cache accesses, each entry comprising offset data of said cache storage location, a page index indicating a page in said memory of said memory storage location corresponding to said cache storage location and cache way data identifying a cache way of said cache storage location, to determine if one or more of said entries comprise offset data corresponding to said cache access request; and in response to step (i) and (ii) generating at least one match each: (iii) comparing said page of said cache access request determined from said buffer with said one or more offset data matched entries and in response to a match; (iv) identifying a cache way of said cache storage location from data stored in said matched entry of said data store.

A third aspect of the present invention provides a data processing means for processing data comprising: a set associative cache means divided into a plurality of cache ways for storing data processed by said data processing means; a buffer means for storing a table comprising a plurality of mappings of pages of virtual addresses to pages of physical addresses for said data processing means; a data store means having a plurality of data entries for storing data identifying an address of a memory location for each of a plurality of recent cache accesses, each of said plurality of data entries comprising a page index indicating a page in an address space, offset data indicating a location within said page and cache way data identifying a cache way of a cache storage location accessed by said cache access; wherein said data processing means is adapted to respond to a cache access request comprising a virtual address indicating a memory location to access said table and said data store means to determine whether said cache access request is to one of said plurality of recently accessed cache storage locations and if so to identify a cache way of said cache storage location from data stored in both said data store means and said table.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
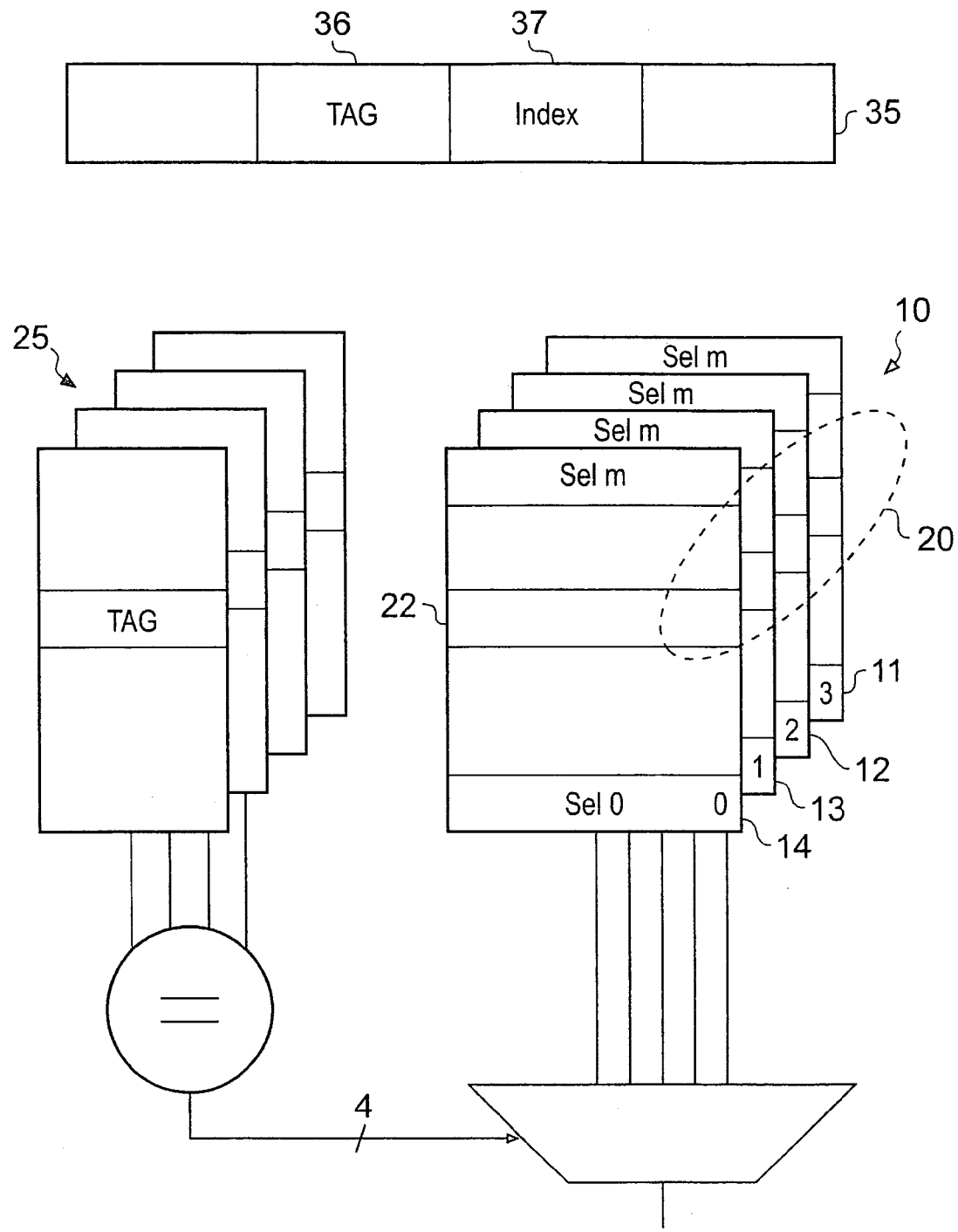
FIG. 1 schematically illustrates a 4-way set associative cache according to the prior art.
Figure 2:
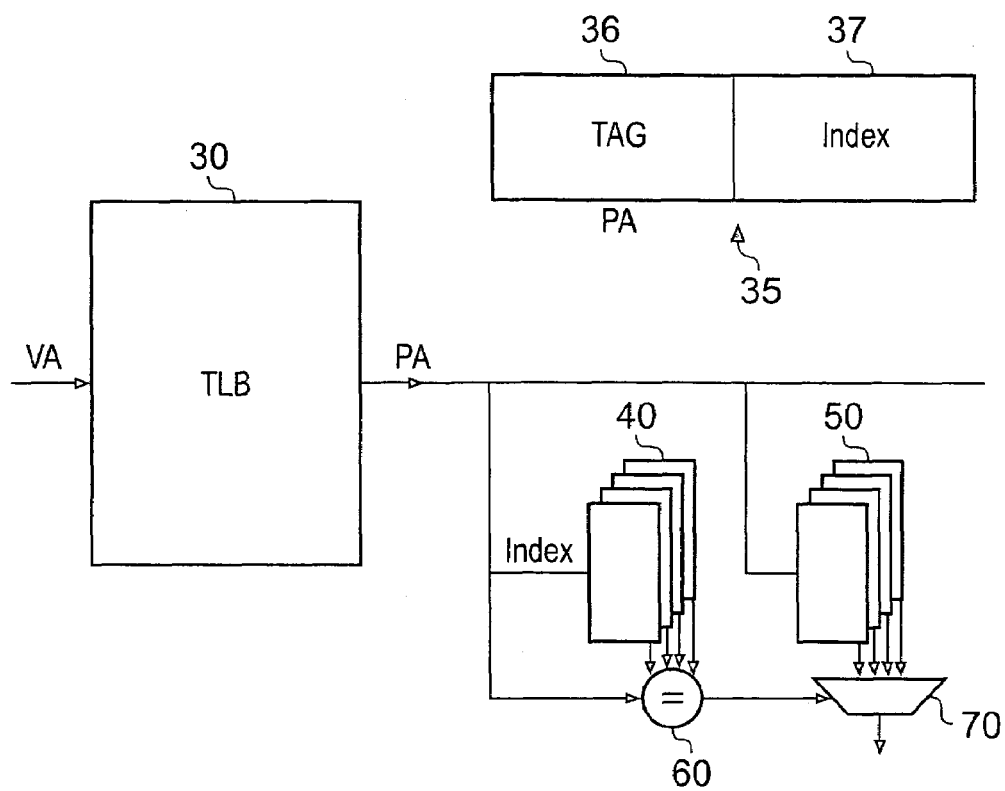
FIG. 2 schematically illustrates data access in a physically indexed/physically tagged cache system according to the prior art.
Figure 3:
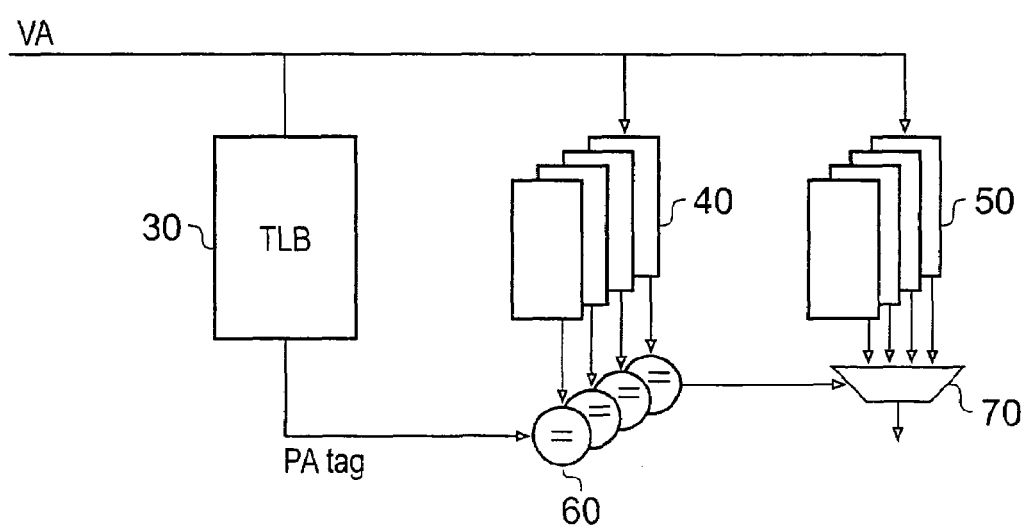
FIG. 3 schematically illustrates data access in a virtually indexed/physically tagged cache system according to the prior art.
Figure 4:
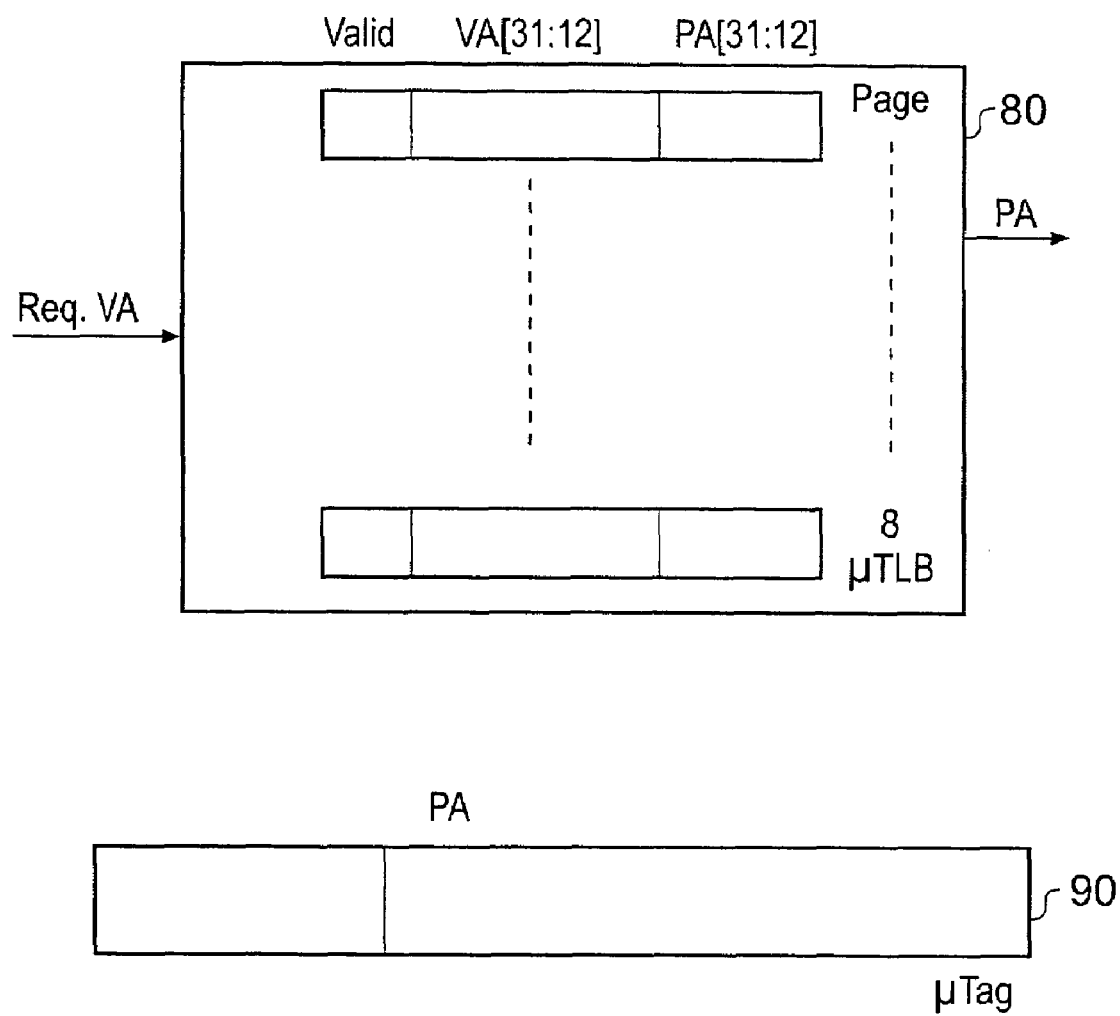
FIG. 4 schematically shows a μTLB table and μTAG according to the prior art.
Figure 5:
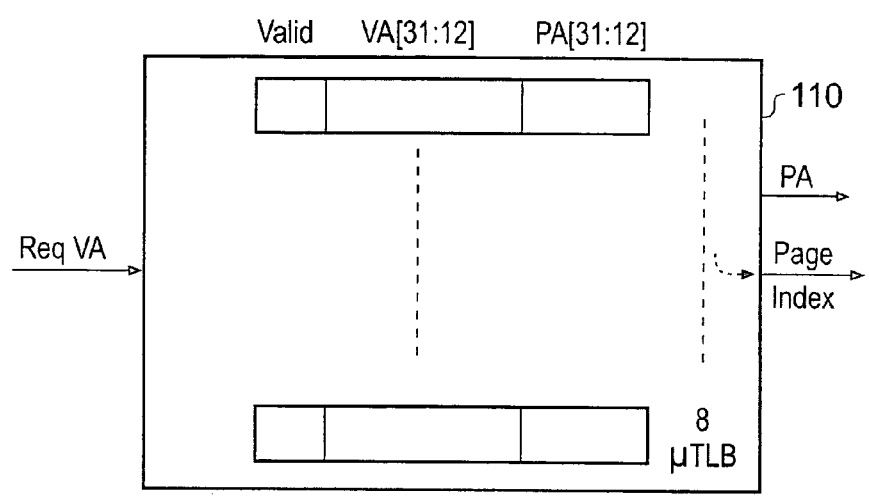
FIG. 5 schematically shows a μTLB table and μTAG according to an embodiment of the present invention.
Figure 5:
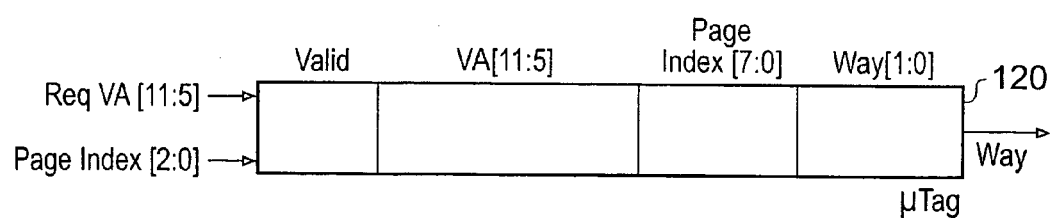

FIG. 5 shows a μTLB 110 and a μTAG 120 according to an embodiment of the present invention. The μTLB 110 is similar to the μTLB of the prior art except that it has an additional output that outputs a page index. The μTLB 110 comprises mapping of pages of the virtual address space to the physical address space. It comprises eight pages and each is 4 Kbytes in size in this embodiment. Thus, in this embodiment bits 31 to 12 of eight virtual addresses are stored along with bits 31 to 12 of their equivalent eight physical addresses. The table therefore maps 32 Kbytes of memory in eight pages. This 32 Kbytes is a portion of the entire memory that the processor can use and is not the complete memory space. Generally the table is populated for a particular application and thus, this 32 Kbytes is selected to be the portion of the memory space that is most likely to be used by the application and therefore it is unlikely that memory space outside of this will be required by a processor executing the application. For each virtual to physical address mapping there is a page index associated with it, such that the lengthy mapping can be identified by this two bit page index.

In addition to this μTLB table, FIG. 5 also shows a μTAG store 120. This μTAG 120 is in this embodiment a register that stores information concerning a previous cache access that has completed. The information that is stored is bits 5 to 11 of the virtual address of the cache access which are the bits that determine the offset within a page in the cache that is accessed. Then there is a page index number which determines in conjunction with the μTLB table which page is accessed and there is also information indicating which way in the cache was accessed.

Although only a single register 120 is shown, in reality there will be several registers storing the result of several accesses in a register bank.

Figure 6:
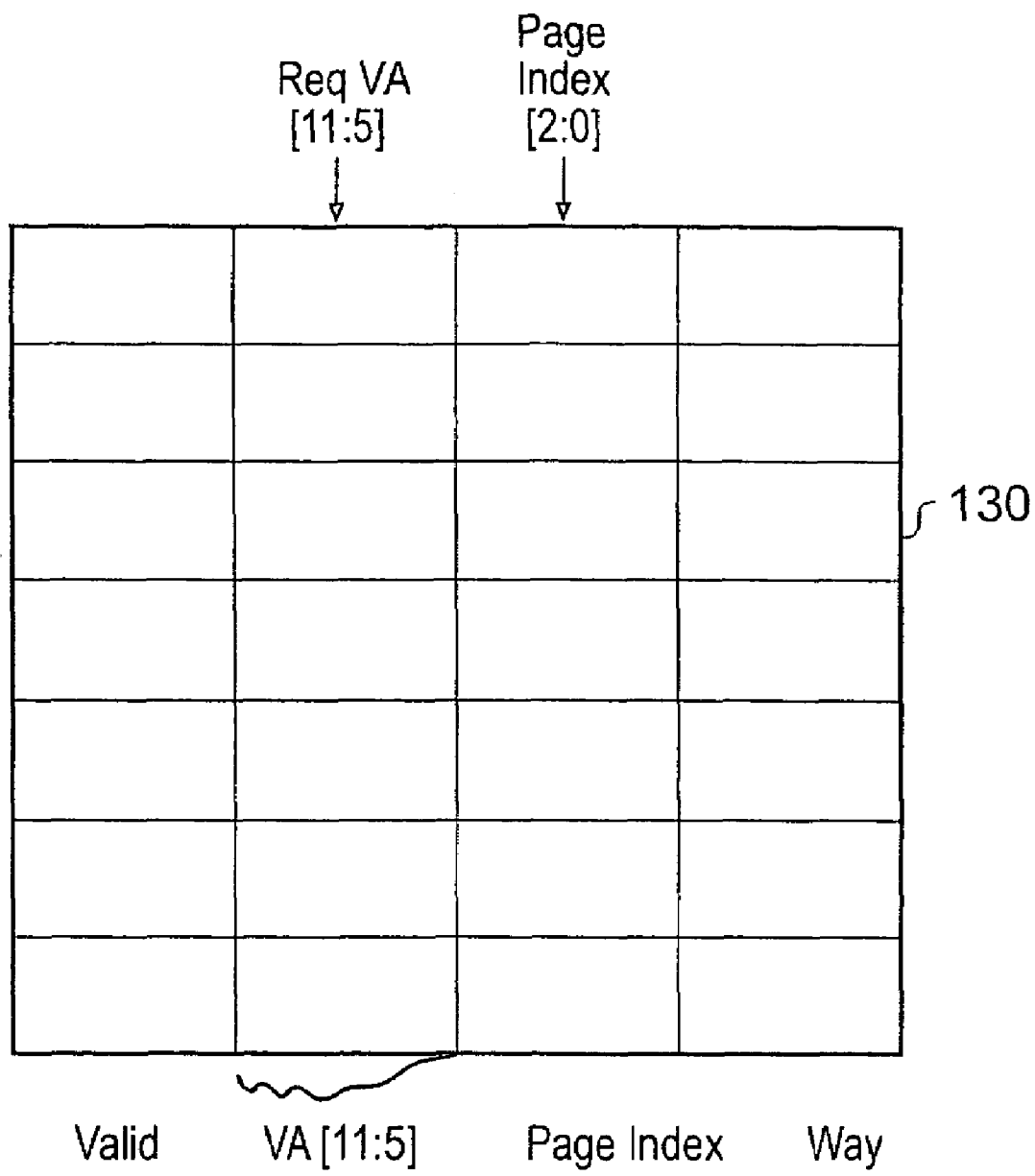
FIG. 6 schematically shows a μTAG store according to an embodiment of the present invention.

FIG. 6 shows such a register bank 130 wherein a plurality of recent cache access information is stored.

As can be seen from FIG. 6, there are two inputs to the data store or register bank 130 and these are the portion of the cache access request that have the bits corresponding to the offset within a page i.e. bits 11 to 5 and the page index information. This page index information is information derived from the μTLB 110 and as there are eight possible pages the page index indicating one of these pages need only be three bits wide. Thus, buffer 110 and data store 130 are sufficient between them to store information that can identify a cache access request. They also store the information as to which cache way the cache location corresponding to the cache access request was located in. Thus, a subsequent cache access request can be compared with the data in these two data stores and it can be determined whether information relating to this cache access request is stored. If it is then the cache way where the data is located can be accessed avoiding the need to enable multiple cache ways to allow a cache access.

Figure 7:
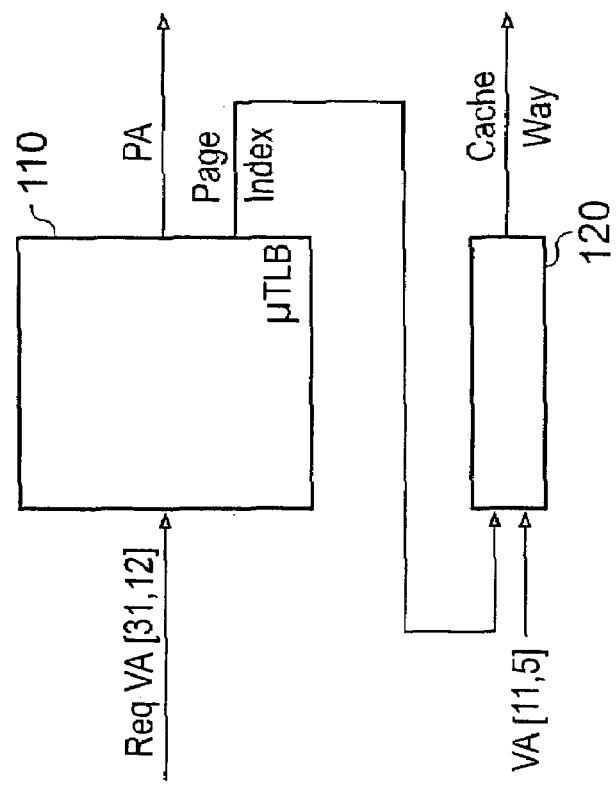
FIG. 7 schematically illustrates shows a μTLB table and μTAG connected together according to an embodiment of the present invention.

FIG. 7 shows a μTLB 110 and a μTAG 120 according to an embodiment of the present invention. When a cache access request is received, the higher bits of the virtual address, in this embodiment bits 31 to 12, are sent to the μTLB to find what page of memory this virtual access corresponds to. Thus, the table within the μTLB is accessed and these bits of the virtual address are compared to the virtual address bits stored within the μTLB and in response to a match the corresponding bits of the physical address are output along with a page index which indicates which of the eight pages within the μTLB have been hit. In effect there is always a valid μTLB entry associated with a cache request since if there is not a hit the processor waits until the corresponding entry is loaded from the main TLB table. Thus, there is always in effect a hit, however, in the latter case the data store comprising the μTAG 120 is flushed to keep consistency between the μtags and μTLB and the cache access is performed in a conventional manner as is described in the prior art section and the μTLB is updated. In parallel to the higher bits of the virtual address being input to the μTLB 110, the lower bits 11 to 5 are input to data store 130 (not shown) comprising μTAGs 120. Bits 11 to 5 of the virtual address are compared to the corresponding bits within the μTAGs 120. These bits indicate an offset within a memory space page. If a hit is found, or possibly several hits, then the data store awaits the page index output from the μTLB 110 and the page index of the entries on which there was a hit for the lower bits of the virtual address are compared with the page index output from μTLB 110, and if one of them is a hit then the cache way data corresponding to this hit is output and the cache access request can enable the specified way without the need to activate the other cache ways in the data RAM. FIG. 7 shows an embodiment where the page table sizes are 4 Kbytes and are all equal in size.

Figure 8:
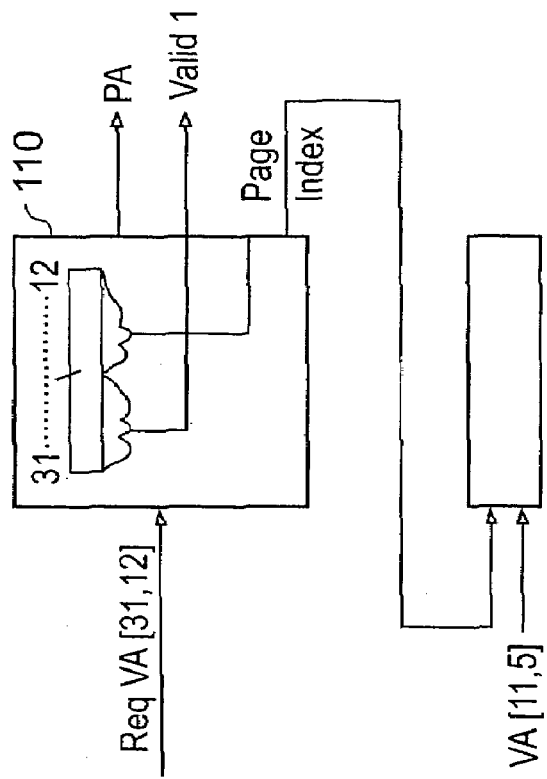
FIG. 8 schematically shows a μTLB table and μTAG connected together according to an alternative embodiment of the present invention.

FIG. 8 shows an alternative embodiment in which page sizes may be different. In this embodiment the request for the cache access is to one of the larger 1 Mbyte pages. Thus, only a portion of the higher bits 31 to 12 are required to identify this page. However, all of the bits 31 to 12 are input to the μTLB 120. All bits 31 to 12 are actually stored for each page within the μTLB and there are the necessary comparators associated with all of these bits as the μTLB table 120 is set up to store different sized pages down to ones that are 4 Kbytes in size, and thus, each entry has sufficient storage and comparators for a 4 Kbyte size page. Thus, these bits are all compared and the higher order bits are used to indicate that there is a hit in the large 1 Mbyte page and the page index corresponding to this 1 Mbyte page is output along with the valid1 which indicates that there is a hit in this page. In addition, the further bits are compared with the further bits stored to see whether or not this cache access is to a 4 Kbyte section within the 1 megabyte table for which information is stored in the μTLB table. If there is a hit on these further bits then there is sufficient information from this and from the offset comparison in the μTAG to identify the cache access request as being the same or different to previous cache access requests stored in the data store 130. If there is not a hit on these further bits then the access is not to the 4 Kbyte section within the 1 Mbyte page that is stored. In this case, the cache access is not to a recent cache access and as such, the cache access request is performed in a conventional manner. The section within the larger 1 Mbyte page in the µTLB table is then updated to correspond to the section of the most recent cache access request and the data store is also updated with a µTAG corresponding to this cache access. This keeps the data stored corresponding to the most recent accesses and makes it most likely that there will be a hit in these two tables and that the benefit of the power saving associated with finding the cache way in this manner is gained.

Figure 9:
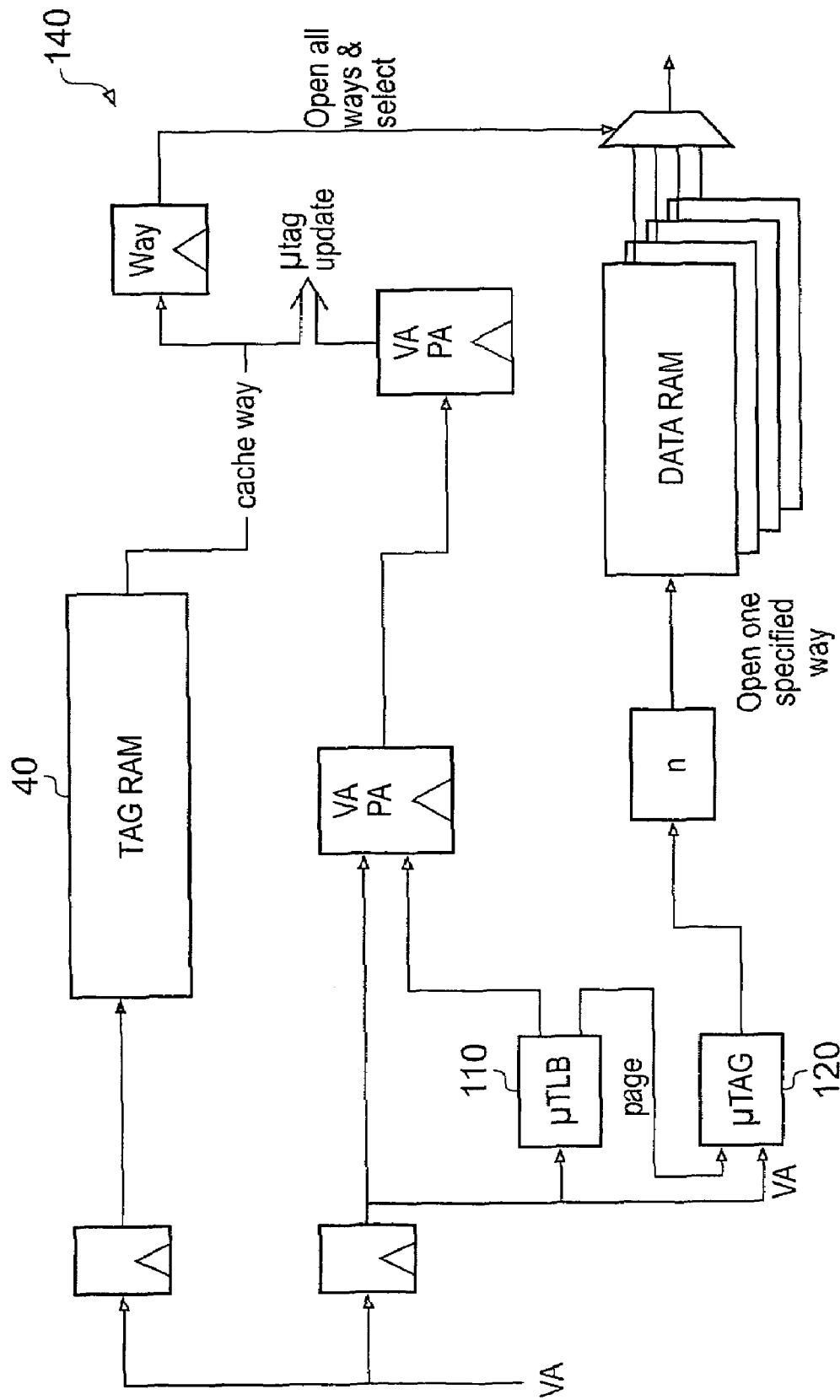
FIG. 9 schematically shows a portion of a data processing apparatus comprising a μTLB table and μTAG data RAM and TAG RAM according to an embodiment of the present invention.

FIG. 9 shows a data processing apparatus 140 comprising data and TAG RAMS in addition to a µTLB table and µTAG store. It schematically shows how identifying a cache way using previous cache access request information according to an embodiment of the present invention is performed in parallel to a traditional access of the TAG RAMS and if a cache way is identified this is used to reduce the need to activate more than one way in the data RAMs wherever possible.

In this figure the virtual address of the cache access request is input to TAG RAM 40 and to µTLB 110 and to µTAG 120 in parallel. If the cache access is to a location accessed recently then the cache way can be determined from the µTLB 110 and µTAG 120. This information is retrieved and forwarded and only one of the cache ways is enabled in the data RAM. If this information is not stored in the µTLB table or µTAGs then all ways are enabled and one of them is selected from the information found from the TAG RAM using multiplexer 140. If this does occur then the information of which cache way the access was to is derived from the TAG RAM along with the information from the µTLB giving the page index. The lower bits of the virtual address along with the cache way information and a page index are stored in µTAG 120 as this is updated. Thus, one of the entries is overwritten with this more recent data. Selecting which entry to overwrite is usually done in a round robin way and thus it is the oldest entry that is overwritten.

In a case that there is a miss in the µTLB then the µTLB table 120 is flushed, which is done by marking all the valid bits as invalid and the µTLB itself is updated to hold the page where there was a miss and the µTAG data store 120 is populated with cache access requests following that cache access requests.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processor operable to process data in said data processor comprising:
a set associative cache divided into a plurality of cache ways and operable to store data processed by said data processor;
a buffer operable to store a table comprising a plurality of mappings of pages of virtual addresses to pages of physical addresses for said data processor;
a data store comprising a plurality of data entries each operable to store data for identifying an address of a memory location for each of a plurality of recent cache accesses, each of said plurality of data entries comprising a page index indicating a page in an address space, offset data indicating a location within said page and cache way data identifying a cache way of a cache storage location accessed by said cache access; wherein said data processor is operable in response to a cache access request comprising a virtual address indicating a memory location to access said table and said data store to determine whether said cache access request is to one of said plurality of recently accessed cache storage locations and if so to identify a cache way of said cache storage location from data stored in both said data store and said table, wherein said data processor is operable in response to said cache access request to:
transmit a higher portion of said virtual address to said buffer and to compare said higher portion with said virtual address portion of said mappings stored in said table and to transmit a lower portion of said virtual address to said data store and to compare said lower portion with said offset data; and
in response to a match in said buffer, to determine a page of said physical memory from said match and to output a page index identifying said page to said data store; and
in response to at least one match of said lower portion with said offset data to compare said at least one page index stored associated with said at least one matched data with said page index output by said buffer and in response to a match, said data processor is operable to identify said cache way from cache way data stored in an entry with said matched page index and offset data.

2. A data processor according to claim 1, wherein said cache comprises an instruction cache.

3. A data processor according to claim 1, wherein in response to said comparison of said higher order of said virtual address with said virtual address portion of said mappings stored in said buffer not generating a match said data processor is operable to flush said data store.

4. A data processor according to claim 1, wherein said pages of addresses are all of equal size.

5. A data processor according to claim 1, wherein said pages of addresses are not all of equal size.

6. A data processor according to claim 5, wherein said buffer is operable to store for larger page sizes bits additional to those required for identifying said larger page.

7. A data processor according to claim 1, wherein said data processor is operable to compare said higher portion of said virtual address with said portion of said mappings stored in said buffer and to compare said lower portion of said virtual address with said offset data stored in said data store at the same time.

8. A data processor according to claim 1, wherein said data store further comprises a valid bit.

9. A data processor according to claim 1, wherein in response to said cache line and page index data not generating a match said data processor is operable to perform said cache access using conventional means and following said cache access completing, said data processor is operable to update said data store to store offset data, page index data and cache way data of said completed cache access in said data store.

10. A method of determining which of a plurality of cache ways a cache access request is to access comprising the steps of:
in response to a cache access request comprising a virtual address:
(i) accessing a buffer operable to store a plurality of mappings of pages of virtual addresses to pages of physical addresses to determine a page of said cache access request by transmitting a higher portion of said virtual address to said buffer and comparing said transmitted higher portion with said virtual address portion of said mappings stored in said table and in response to a match in said buffer, determining a page of said physical memory from said match and outputting a page index identifying said page to said data store;

(ii) accessing a data store comprising a plurality of entries each operable to store data identifying a cache storage location within said cache for each of a plurality of recent cache accesses, each entry comprising offset data of said cache storage location, a page index indicating a page in said memory of said memory storage location corresponding to said cache storage location and cache way data identifying a cache way of said cache storage location, to determine if one or more of said entries comprise offset data corresponding to said cache access request by transmitting a lower portion of said virtual address to said data store and comparing said lower portion with said offset data; and in response to step(i) and (ii) generating at least one match each;

(iii) in response to at least one match of said lower portion with said offset data, comparing said at least one page index stored associated with said at least one matched data with said page index output by said buffer;

(iv) in response to a match, identifying a cache way of said cache storage location from data stored in said matched entry of said data store.

11. A method according to claim 10, wherein in response to step (ii) not generating a match not performing step (iii) or (iv) and performing a further step of flushing said data store.

12. A method according to claim 10, wherein said step (i) and (ii) are performed at substantially the same time.

13. A method according to claim 10, wherein in response to step (ii) or (iii) not generating a match not performing step (iv) and performing a further step of performing said cache access using conventional means and following said cache access completing, updating said data store to store offset data, page index data and cache way data of said completed cache access in said data store.

14. A data processing means for processing data comprising:

a set associative cache means divided into a plurality of cache ways for storing data processed by said data processing means;

a buffer means for storing a table comprising a plurality of mappings of pages of virtual addresses to pages of physical addresses for said data processing means;

a data store means having a plurality of data entries for storing data identifying an address of a memory location for each of a plurality of recent cache accesses, each of said plurality of data entries comprising a page index indicating a page in an address space, offset data indicating a location within said page and cache way data identifying a cache way of a cache storage location accessed by said cache access; wherein said data processing means is adapted to respond to a cache access request comprising a virtual address indicating a memory location to access said table and said data store means to determine whether said cache access request is to one of said plurality of recently accessed cache storage locations and if so to identify a cache way of said cache storage location from data stored in both said data store means and said table, wherein said data processing means, in response to said cache access request, comprises a means for:

transmitting a higher portion of said virtual address to said buffer and for comparing said higher portion with said virtual address portion of said mappings stored in said table and for transmitting a lower portion of said virtual address to said data store and for comparing said lower portion with said offset data; and determining, in response to a match in said buffer, a page of said physical memory from said match and for outputting a page index identifying said page to said data store; and comparing, in response to at least one match of said lower portion with said offset data, said at least one page index stored associated with said at least one matched data with said page index output by said buffer and, in response to a match, said data processing means is configured to identify said cache way from cache way data stored in an entry with said matched page index and offset data.

* * * * *